United States Patent
Grbovic

(10) Patent No.: US 8,730,699 B2
(45) Date of Patent: May 20, 2014

(54) CURRENT-SOURCE POWER CONVERTER USING NORMALLY-ON FIELD EFFECT TRANSISTORS

(75) Inventor: Petar Grbovic, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 338 days.

(21) Appl. No.: 12/942,370

(22) Filed: Nov. 9, 2010

(65) Prior Publication Data

US 2011/0134675 A1 Jun. 9, 2011

(30) Foreign Application Priority Data

Dec. 3, 2009 (FR) ...................................... 09 58615

(51) Int. Cl.
*H02M 7/217* (2006.01)
*H02H 7/125* (2006.01)

(52) U.S. Cl.
USPC ............................................. 363/127; 363/53

(58) Field of Classification Search
USPC ......... 363/34–35, 37, 52–53, 81, 84, 89, 123, 363/125, 127
See application file for complete search history.

(56) References Cited

U.S. PATENT DOCUMENTS

| | | | | |
|---|---|---|---|---|
| 5,045,991 | A * | 9/1991 | Dhyanchand et al. | 363/89 |
| 7,965,484 | B2 * | 6/2011 | Baudesson et al. | 361/93.9 |
| 8,040,648 | B2 * | 10/2011 | Baudesson | 361/91.5 |
| 2003/0039130 | A1 * | 2/2003 | Curtiss | 363/37 |
| 2003/0048097 | A1 * | 3/2003 | Ishihara et al. | 323/285 |
| 2004/0160792 | A1 * | 8/2004 | Youm et al. | 363/37 |
| 2006/0226819 | A1 * | 10/2006 | Xu et al. | 323/268 |
| 2008/0068870 | A1 * | 3/2008 | Eguchi et al. | 363/37 |
| 2010/0073969 | A1 * | 3/2010 | Rajagopalan et al. | 363/37 |
| 2010/0295523 | A1 | 11/2010 | Grbovic | |

OTHER PUBLICATIONS

Friedli et al., "Design and Performance of a 200-kHz All-SiC JFET Current DC-Link Back-to-Back Converter", Sep./Oct. 2009, pp. 1868-1878.*

Thomas Friedli, et al., "Design and Performance of a 200-kHz All-SiC JFET Current DC-Link Back-to-Back Converter", IEEE Transactions on Industry Applications, XP011270486, vol. 45, No. 5, Sep./Oct. 2009, pp. 1868-1878.

French Preliminary Search Report issued Aug. 5, 2010, in French Application No. 0958615, filed Dec. 3, 2009.

* cited by examiner

*Primary Examiner* — Adolf Berhane
*Assistant Examiner* — Jeffrey Gblende
(74) *Attorney, Agent, or Firm* — Oblon, Spivak, McClelland, Maier & Neustadt, L.L.P.

(57) ABSTRACT

The invention relates to a current-source power converter comprising, in a module thereof, switching legs having normally-on field effect transistors each controlled by a gate control device. A normally-open auxiliary switch is in series with the switching legs and connected to the positive line of the power supply bus. This auxiliary switch can prevent the mains from short-circuiting during start-up or during malfunction of the auxiliary power supply.

20 Claims, 2 Drawing Sheets

CURRENT-SOURCE POWER CONVERTER USING NORMALLY-ON FIELD EFFECT TRANSISTORS

The present invention relates to a current-source power converter using normally-on field effect transistors. This power converter may be used in applications such as variable speed drives, uninterruptible power supplies, active filters or DC/DC converters

BACKGROUND OF THE INVENTION

As is known, starting with an AC current source, a current-source power converter can be used to obtain, by virtue of an active rectifier module, a constant DC current on a power supply bus having an inductor. In a variable speed drive application, the constant current flowing in the power supply bus is then chopped by an inverter module so as to obtain a variable output current intended to supply an electrical load.

A current-source power converter comprising a rectifier module connected upstream to several inputs supplied by a current source, a power supply bus connected downstream of the rectifier and provided with a positive line and with a negative line, an inductor being connected to the positive line and/or to the negative line of the power supply bus, and an inverter module connected downstream of the power supply bus and designed to supply a variable current to an electrical load is known from the publication entitled "*Design and Performance of a 200 kHz All-SiC JFET Current Source Converter*" by Thomas Friedli, Simon D. Round, Dominik Hassler and Johann W. Kolar. The rectifier module comprises several switching legs connected between the positive line and the negative line of the power supply bus, each switching leg comprising two transistors in series and a connection middle-point located between the two transistors and linked to one of the inputs. The rectifier module also comprises several switching legs connected between the positive line and the negative line of the power supply bus, each switching leg comprising two transistors in series and a connection middle-point located between the two transistors and linked to the electrical load to be controlled. In the aforementioned publication, the transistors of the rectifier module and of the inverter module are normally-on SiC JFETs, that is to say that they conduct when no voltage is applied to their gate. Normally-on components are very suitable for use in current-source power converters because this type of converter requires two transistors to be permanently conducting, so that the current source is never connected to an open circuit.

However, when using normally-on components it is necessary to prevent the mains from short-circuiting during start-up or during malfunction of the auxiliary power supply, the latter being intended to control the gates of the transistors.

In the aforementioned publication, to prevent the mains from short-circuiting it was suggested to place, in the input stages connected to the mains, upstream of the rectifier, relays switched to the open state during start-up. However, this solution is unsatisfactory because the three relays present in the input stages must be sized to withstand all of the current from and all of the mains voltage.

BRIEF SUMMARY OF THE INVENTON

The object of the invention is therefore to provide a current-source power converter that makes use of normally-on components and that prevents the mains from short-circuiting during start-up or during potential malfunctions of the auxiliary power supply intended to control the gates of the transistors, and to do so without employing oversized components.

This object is achieved by a power converter comprising:
a rectifier module connected upstream to several inputs supplied by a current source;
a power supply bus connected downstream of the rectifier module and provided with a positive line and a negative line;
an inductor connected to the positive line or to the negative line of the power supply bus;
the rectifier module comprising several switching legs connected between the positive line and the negative line of the power supply bus, each switching leg comprising a top transistor and a bottom transistor in series and a connection middle-point located between the top transistor and the bottom transistor and linked to an input;
the transistors being normally-on field effect transistors and each being controlled by a gate control device;
an auxiliary normally-open switch placed in series with the switching legs and connected to the positive line of the power supply bus;
a control device for controlling the auxiliary switch.

According to one feature, the converter comprises an inverter module connected downstream of the power supply bus and upstream of an electrical load to be controlled.

According to another feature, each transistor is controlled by a gate control device and the gate control devices of the top transistors are connected to the positive line of the power supply bus.

According to another feature, the converter comprises an overvoltage protection system connected between the positive line and the negative line of the power supply bus.

According to another feature, the converter comprises means for detecting a malfunction designed to interact with the control device for the auxiliary switch.

According to another feature, the auxiliary switch is an electromechanical relay or a MOSFET, BJT or IGBT electronic switch.

According to another feature, the top and bottom transistors of the switching legs are JFETs.

According to another feature, the JFET transistors are fabricated from silicon carbide or gallium nitride.

BRIEF DESCRIPTION OF THE SEVERAL VIEWS OF THE DRAWINGS

Other features and advantages of the invention will become clear from the following detailed description of an embodiment of the invention given by way of example and shown in the appended drawings in which.

DETAILED DESCRIPTION OF THE INVENTON

The invention relates to a current-source power converter. The current-source power converter of the invention may be used in applications such as variable speed drives, uninterruptible power supplies (UPS), active filters or DC/DC converters.

The current-source power converter of the invention therefore comprises a single rectifier module, as for example in an electrical power supply, or combines a rectifier module and an inverter module, as for example in a variable speed drive.

The principle of the invention consists in using normally-on field effect transistors in the rectifier module. Normally-on components are very suitable for use in current-source power converters. However, this leads to other problems which it is necessary to solve. The first problem to be solved appears during start-up of the converter and the second problem may appear during a malfunction of the auxiliary power supply used to deliver a gate voltage to the transistors. In both cases, the mains must be prevented from short-circuiting when a control voltage cannot be applied to the gates of the transistors.

Figure 1:
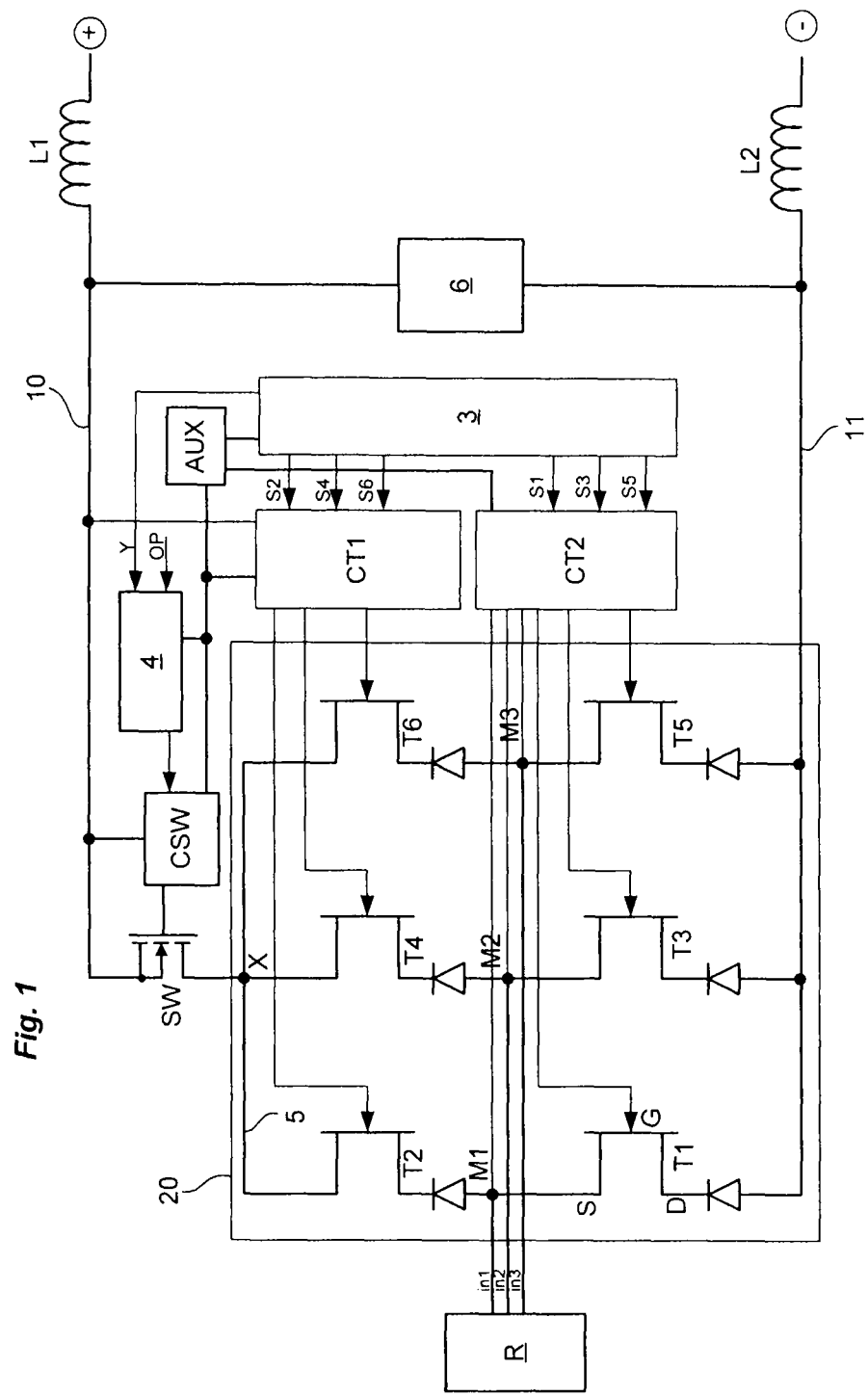
FIG. 1 shows the power converter of the invention using a rectifier module based on normally-on JFET transistors.

FIG. 1 shows a current-source power converter comprising several inputs in1, in2, in3 (for example three inputs in a three-phase mains) connected at one end to the mains R and at the other end to a rectifier module 20. The rectifier module 20 is of active type and comprises several switching legs, for example three switching legs, intended to convert an AC current applied to the converter inputs in1, in2, in3 connected to the mains R into a constant DC current. The constant DC current obtained is applied to a power supply bus provided with a positive line 10 and a negative line 11. The converter furthermore comprises at least one inductor L1 connected to the positive line 10 or to the negative line 11 of the power supply bus. Ideally, the converter may comprise a first inductor L1 connected to the positive line 10 of the power supply bus and a second inductor L2 connected to the negative line 11 of the power supply bus (see FIG. 1). The three switching legs of the rectifier module 20 are each connected in parallel between the positive line 10 and the negative line 11 of the power supply bus. Each switching leg comprises a top transistor T2, T4, T6 and a bottom transistor T1, T3, T5 separated by a connection middle-point M1, M2, M3 linked to a distinct input in1, in2, in3 of the converter. In a current-source power converter, each transistor T1-T6 is connected in series with a diode.

According to the invention, each transistor T1-T6 of the rectifier module is a normally-on field effect transistor. A field effect transistor, such as for example a JFET or a MOSFET, is a known electronic power switch that comprises a control gate (G) the function of which is to permit or prevent a current from flowing between a drain (D) and a source (S). Such a transistor is said to be a normally-on transistor if the voltage $V_{GS}$ between the gate and the source is near zero. This means that the drain-source path is conducting in the absence of a control voltage $V_{GS}$. In the presence of a negative control voltage $V_{GS}$ between the gate and the source, the normally-on field effect transistor is in the off-state. A normally-on JFET transistor is turned off by applying a gate-source voltage $V_{GS}$ for example of at least −15 volts and a normally-on MOSFET transistor is turned off with a voltage $V_{GS}$ for example of at least −5 volts.

The field effect transistors T1-T6 used in the power converter of the invention will, for example, be fabricated from a wide band-gap material such as for example silicon carbide or gallium nitride. As is known, a normally-on JFET transistor made from a wide band-gap material has the advantages of being faster to switch, of generating fewer on-state conduction losses (low on-state resistor $R_{DSon}$), of having a better heat withstand and of being smaller. In the rest of the description and in the appended FIG. 1, the transistors T1-T6 of FIG. 1 are for example JFETs.

Each field effect transistor T1-T6 of the switching legs is opened using a specific gate control device CT1, CT2 (schematized in a simplified manner in FIG. 1 by two separate blocks). Each gate control device is supplied by an auxiliary power supply AUX connected to the inputs in1, in2, in3 of the converter, which allows a gate voltage $V_G$ to be applied to the transistor so as to turn the transistor off or on. In addition to the power supply, each control device receives from a central control system 3 PWM (pulse width modulation) control signals S1 to S6 according to a control rule executed by the central control system 3. Each control device of the top transistors T2, T4, T6 is connected to the positive line 10 of the power supply bus, whereas each control device of the bottom transistors T1, T3, T5 is connected to the connection middle-point M1, M2, M3 of the switching leg of its transistor.

According to the invention, a normally-open auxiliary switch SW is connected in series with the switching legs and links the switching legs to the positive line 10 of the power supply bus. In other words, this auxiliary switch SW is connected between the top transistors T2, T4, T6 of the rectifier module 20 and the positive line 10 of the power supply bus. In FIG. 1, the auxiliary switch SW is connected to a point X on a conducting line 5 joining the drains of the three top transistors T2, T4, T6 of the three switching legs.

The auxiliary switch SW may for example be an electromechanical relay, for example a MEMS (micro-electromechanical system), or it may be a MOSFET (metal oxide semiconductor FET), IGBT (insulated gate bipolar transistor) or BJT (bipolar junction transistor) electronic switch. In FIG. 1, the auxiliary switch is represented by a silicon MOSFET. The auxiliary switch SW is closed by an appropriate known control device CSW (details of which are not given in the present application) controlled by a control signal S delivered by a module 4 when various conditions are fulfilled simultaneously, that is to say when no UVLO (undervoltage lockout) appears on the auxiliary power supply, when the overcurrent protection (OP) has not been actuated and when a signal Y is provided by the central control system 3.

Of course, for an equivalent operation it is entirely possible to replace the auxiliary switch SW common to the three switching legs with one auxiliary switch SW connected in series on each switching leg, these auxiliary switches being all controlled simultaneously. This embodiment is not shown in the appended figures but it falls perfectly within the scope of the invention.

The current-source power converter shown in FIG. 1 may comprise, downstream of its power supply bus, an inverter module (not shown in FIG. 1) intended to chop the DC current flowing in the bus so as to create a variable current intended to supply an electrical load. In this case, one possible application for example is a variable speed drive.

Moreover, the current-source power converter may comprise an overvoltage protection system 6 connected between the positive line 10 and the negative line 11 of the power supply bus. This system 6 is intended to prevent overvoltages and thus protect the rectifier module 20 when the auxiliary switch SW is opened although the current flowing in the bus is still non-zero. In this situation, the voltage across the terminals of the protection system 6 tends to become negative unblocking the protection system 6 to provide a current path between the positive line 10 and the negative line 11 of the power supply bus.

Figure 2A:
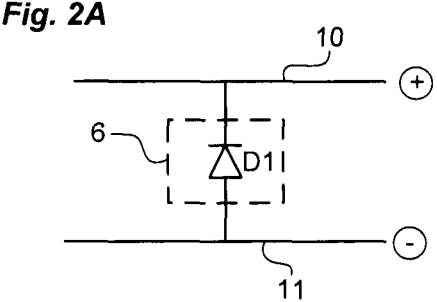
FIGS. 2A and 2B show two distinct variant embodiments of the overvoltage protection system seen in FIG. 1.

In a first variant embodiment shown in FIG. 2A, the overvoltage protection system 6 may be a simple diode D1 connected so as to allow current to flow from the negative line 11 to the positive line 10 of the power supply bus and which, when the voltage becomes negative, allows current to flow from the positive line 10 to the negative line 11 of the power supply bus.

Figure 2B:
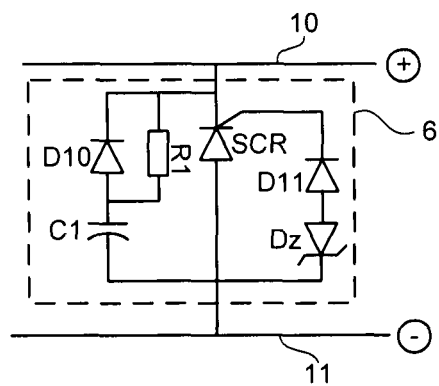

In a second variant embodiment shown in FIG. 2B, the overvoltage protection system 6 comprises a thyristor SCR connected between the positive line 10 and the negative line 11 of the power supply bus. In this variant, the system 6 furthermore comprises a first assembly consisting of a capacitor C1 and a first diode D10 in series and connected in parallel to the thyristor SCR between its anode and its cathode. Moreover, the system furthermore comprises a second assembly consisting of a second diode D11 and an opposing Zener diode Dz connected parallel to the thyristor SCR between its trigger and its anode. A resistor R1 is also connected parallel to the first diode D10. When the voltage across the terminals of the protection system becomes negative, the capacitor charges. When the voltage across the terminals of the Zener diode Dz reaches a maximum, the two diodes D11, Dz in series pass the current and actuate the thyristor SCR which then passes current from the positive line 10 to the negative line 11 of the power supply bus.

The operation of the power converter of the invention equipped with the auxiliary switch SW is explained below.

At start-up, the auxiliary power supply system AUX is still not actuated and cannot therefore deliver sufficient voltage to turn off the transistors T1-T6 of the rectifier module 20. Since the auxiliary switch SW is initially open, the current cannot therefore flow through the switching legs of the rectifier module and short-circuit the mains R.

After a certain period of time, the auxiliary power supply system AUX has started-up and can supply the control devices CT1, CT2 for the transistors T1-T6 of the rectifier module 20. The transistors T1-T6 can therefore be turned off directly by their control device CT1, CT2. The auxiliary switch SW is closed by its control device CSW and the power converter can then operate normally.

During normal operation of the power converter, the auxiliary power supply system AUX may, for example, malfunction. In this situation, the transistors T1-T6 of the switching module can no longer be kept in the off-state. As shown in FIG. 1, when a malfunction is detected the control signal Y can no longer be generated and sent to the control device CSW for the auxiliary switch SW. The auxiliary switch SW is therefore opened. In this way, as previously, the current can therefore no longer flow through the switching legs of the rectifier module 20 and short-circuit the mains R.

The benefit of the invention lies especially in the fact that it makes use of a single auxiliary switch SW to solve the problems mentioned. Moreover, it is not necessary to size the switch to withstand all of the voltage applied as input. The auxiliary switch SW must be sized to withstand all of the current but may be sized to withstand a smaller voltage than the maximum voltage.

The invention claimed is:

1. A power converter comprising:
a rectifier module connected upstream thereof to a plurality of inputs supplied by a current source;
a power supply bus connected downstream of the rectifier module and including a positive line and a negative line;
an inductor connected to at least one of the positive line and the negative line of the power supply bus;
the rectifier module including a plurality of switching legs connected between the positive line and the negative line of the power supply bus, each switching leg including a top transistor and a bottom transistor in series and a connection middle-point between the top transistor and the bottom transistor, each of the connection middle-points being linked to respective inputs of said plurality of inputs, each of the top and bottom transistors being normally-on field effect transistors and being controlled by a gate control device;
an auxiliary normally-open switch in series with the switching legs and connected to the positive line of the power supply bus; and
a control device to control the auxiliary switch,
wherein the auxiliary switch is initially in an OFF-state at start-up of the power converter so as to isolate the positive line of the power supply bus from the rectifier module,
wherein the gate control device includes a first gate control device portion associated with the top transistors, and a second gate control device portion associated with the bottom transistors, and
wherein the first gate control device portion is connected to the control device and an auxiliary power supply.

2. The power converter according to claim 1,
wherein the first gate control device portion and the top transistors are connected to the positive line of the power supply bus.

3. The power converter according to claim 1, further comprising:
an overvoltage protection system connected between the positive line and the negative line of the power supply bus.

4. The power converter according to claim 1, further comprising:
a detector to detect a malfunction, the detector being connected to an input of the control device for the auxiliary switch.

5. The power converter according to claim 1,
wherein the auxiliary switch is one of an electromechanical relay, a MOSFET electronic switch, a BJT electronic switch, and an IGBT electronic switch.

6. The power converter according to claim 1,
wherein the top and bottom transistors of the switching legs are JFETs.

7. The power converter according to claim 6,
wherein the JFET transistors are fabricated from silicon carbide or gallium nitride.

8. The power converter according to claim 1,
wherein said power converter is a current-source power converter, and
wherein the rectifier is an active-type rectifier.

9. The power converter according to claim 1,
wherein the auxiliary switch is in a conductive state when no undervoltage lockout appears on an auxiliary power supply or when overcurrent protection has not been actuated.

10. The power converter according to claim 1,
wherein the first gate control device portion is connected to the positive line of the power supply bus, and the second gate control device portion is connected to the connection middle-points.

11. The power converter according to claim 10,
wherein the control device for the auxiliary switch is connected to a gate of the auxiliary switch and the positive line of the power supply bus.

12. The power converter according to claim 1,
wherein between the auxiliary switch and the rectifier module consists of a wiring connection.

13. The power converter according to claim 1, wherein the auxiliary power supply is connected to the control device for the auxiliary switch and the gate control device.

14. A converter comprising:
a power supply bus including a positive line and a negative line;
an auxiliary power supply;
a rectifier module including a plurality of inputs, a plurality of switching legs each having a top transistor and a bottom transistor in series and a connection middle-point between the top transistor and the bottom transistor;

an auxiliary normally-open switch having a first end connected to the rectifier module and a second end connected to the positive line of the power supply bus;

a control device to control the auxiliary normally-open switch connected to the auxiliary power supply; and a gate control device connected to the top and bottom transistors, wherein, at start-up, the auxiliary switch is off, so as to prevent current from flowing through the switching legs, wherein the gate control device includes a first gate control device portion associated with the top transistors, and a second gate control device portion associated with the bottom transistors, and wherein the first gate control device portion is connected to the control device and the auxiliary power supply.

15. The power converter according to claim 14, wherein the rectifier module is connectable to the positive line of the power supply bus via the auxiliary normally-open switch, wherein the auxiliary normally-open switch is connected in series with each of the switching legs, and wherein the control device for the auxiliary normally-open switch is connected to a gate of the auxiliary normally-open switch and the positive line of the power supply bus.

16. The power converter according to claim 14, further comprising:

an inductor connected to at least one of the positive line and the negative line of the power supply bus;

an overvoltage protection system connected between the positive line and the negative line of the power supply bus; and a detector to detect a malfunction connected to an input of the control device for the auxiliary normally-open switch.

17. The power converter according to claim 14, wherein the top and bottom transistors are normally-on JFETs, wherein the auxiliary normally-open switch is one of an electromechanical relay, a MOSFET electronic switch, a BJT electronic switch, and an IGBT electronic switch, and wherein each of the connection middle-points is connected to respective inputs of the plurality of inputs of the rectifier module.

18. The power converter according to claim 14, wherein between the auxiliary normally-open switch and the rectifier module consists of a wiring connection.

19. The power converter according to claim 14, wherein the auxiliary power supply is connected to the control device for the auxiliary switch and the gate control device.

20. The power converter according to claim 14, wherein the first gate control device portion is connected to the positive line of the power supply bus, and the second gate control device portion is connected to the connection middle-points, and wherein the control device for the auxiliary switch is connected to a gate of the auxiliary switch and the positive line of the power supply bus.

* * * * *